US010309460B2

(12) United States Patent
Lee et al.

(10) Patent No.: US 10,309,460 B2
(45) Date of Patent: Jun. 4, 2019

(54) BALL BEARING

(71) Applicant: KOREA INSTITUTE OF SCIENCE AND TECHNOLOGY, Seoul (KR)

(72) Inventors: Yong Bok Lee, Seoul (KR); Bok Seong Choe, Seoul (KR); Sangmin Han, Seoul (KR); Jeon Kook Lee, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 0 days.

(21) Appl. No.: 15/964,119

(22) Filed: Apr. 27, 2018

(65) Prior Publication Data

US 2018/0340574 A1 Nov. 29, 2018

(30) Foreign Application Priority Data

May 23, 2017 (KR) .................. 10-2017-0063436

(51) Int. Cl.
F16C 39/06 (2006.01)
F16C 33/38 (2006.01)
(Continued)

(52) U.S. Cl.
CPC ............ F16C 39/063 (2013.01); F16C 19/16 (2013.01); F16C 27/04 (2013.01);
(Continued)

(58) Field of Classification Search
CPC .............. F16C 33/3862; F16C 33/3868; F16C 33/3875; F16C 33/3881; F16C 39/06;
(Continued)

(56) References Cited

U.S. PATENT DOCUMENTS 3,016,274 A 1/1962 Norris
3,923,352 A 12/1975 Pentlicki
(Continued)

FOREIGN PATENT DOCUMENTS

EP 0 849 481 A2 6/1998
EP 1 847 725 B1 8/2015
(Continued)

OTHER PUBLICATIONS

Machine Translation of JP S63-125823 (Year: 1988).*
(Continued)

Primary Examiner — Alan B Waits
(74) Attorney, Agent, or Firm — Rabin & Berdo, P.C.

(57) ABSTRACT

Disclosed is a ball bearing including an inner ring and an outer ring spaced apart from each other, each being rotatable, a cage part including a first cage and a second cage rotatably installed between the inner ring and the outer ring, and having ball receiving part formed along circumferential direction, ball installed in the ball receiving part, and rotating with the cage part as at least one of the inner ring and the outer ring rotates, and magnet which provides a magnetic force to the ball, wherein the first cage has a first seating part which is formed between the ball receiving parts, and on which one side of the magnet is placed, and the second cage has a second seating part which is connected to the first seating part, and on which the other side of the magnet is placed.

6 Claims, 18 Drawing Sheets

(51) Int. Cl.
*F16C 43/06* (2006.01)
*F16C 35/06* (2006.01)
*F16C 19/16* (2006.01)
*F16C 27/04* (2006.01)

(52) U.S. Cl.
CPC ...... *F16C 33/3831* (2013.01); *F16C 33/3881* (2013.01); *F16C 35/06* (2013.01); *F16C 43/065* (2013.01); *F16C 2202/40* (2013.01)

(58) Field of Classification Search
CPC ...... F16C 39/063; F16C 39/066; F16C 35/06; F16C 19/16; F16C 43/065; F16C 2202/40; F16C 27/04
See application file for complete search history.

(56) References Cited

U.S. PATENT DOCUMENTS

| | | | |
|---|---|---|---|
| 4,278,307 A | 7/1981 | Olschewski et al. | |
| 5,026,178 A | 6/1991 | Ballhaus | |
| 7,121,729 B2 | 10/2006 | Davis et al. | |
| 7,458,722 B2 | 12/2008 | Chen et al. | |
| 8,104,971 B2 | 1/2012 | Takada et al. | |
| 9,091,302 B2 | 7/2015 | Ohara | |
| 9,341,215 B2 | 5/2016 | Plona | |

FOREIGN PATENT DOCUMENTS

| | | | | |
|---|---|---|---|---|
| JP | 63125823 A | * | 5/1988 | ............ F16C 33/38 |
| JP | 2010-053949 A | | 3/2010 | |
| JP | 2015-059620 A | | 3/2015 | |
| JP | 5797600 B2 | | 10/2015 | |
| KR | 10-2017-0044379 A | | 4/2017 | |

OTHER PUBLICATIONS

J.W. Kannel et al., "The Hidden Cause of Bearing Failure", Machine Design, 1977, pp. 78-82, vol. 49, No. 8.
Liu Xiuhai et al., :Dynamic Stability Analysis of Cages in High-Speed Oil-Lubricated Angular Contact Ball Bearings, Transactions of Tianjin University, 2011, pp. 20-27, vol. 17, Issue 1.

* cited by examiner n=20 000 r/min n=30 000 r/min n=40 000 r/min n=50 000 r/min

FIG. 6A
FIG. 6B
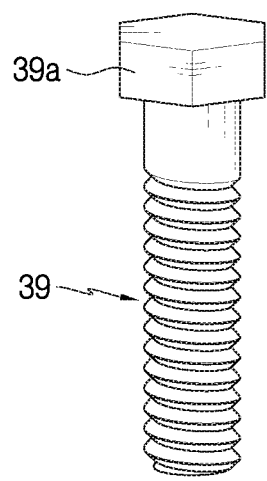
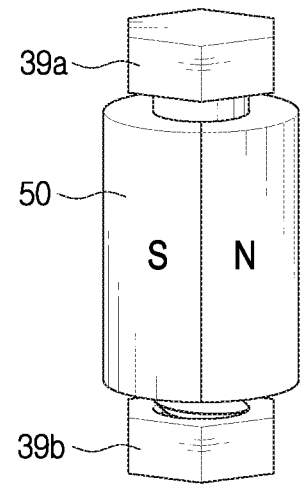
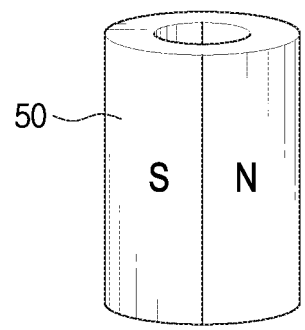
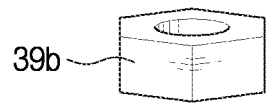

BALL BEARING

CROSS-REFERENCE TO RELATED APPLICATIONS

This application claims priority under 35 U.S.C. § 119 to Korean Patent Application No. 10-2017-0063436, filed on May 23, 2017, in the Korean Intellectual Property Office, the disclosure of which is incorporated herein by reference in its entirety.

TECHNICAL FIELD

The present disclosure relates to a ball bearing for improving tangential damping capacity of a cage part using magnet, contributing to the rotational stability of the cage part.

EXPLANATION ON NATIONAL RESEARCH AND DEVELOPMENT SUPPORT

This research is sponsored by Individual Research Support (Study on Ball Bearing Cage for Extreme Environment, Project No. 1711043660) of National Research Foundation of Korea, Ministry of Science, ICT and Future Planning, under the supervision of Korea Institute of Science and Technology.

BACKGROUND

Recently, rotating devices move toward smaller size, and energy capacity gradually increases. Accordingly, the rotational speed of the main axis gradually increases, and the importance of high speed rotating element bearings gradually increases. Additionally, thus various types of bearings are applied to rotating devices, and among them, a ball bearing is one of the most widely used bearings. A general ball bearing includes an inner ring, an outer ring, and a cage that maintains a gap between balls.

A high speed ball bearing generally rotates by an interference fit between the inner ring and the main shaft, and with rotating and revolving motions of ball bearing elements, the cage also rotates in proportion to the speed of the inner ring. Particularly, in the case of a high speed rotating device, its rotational speed generally has number of DN 1,000,000 (rotary axis diameter (mm)*rpm) or more, and accordingly, the rotational speed of the cage also has number of about DN 400,000 or more. Equation (1) is a mathematical expression of the number of rotations of the cage upon rotation of the inner ring.

Equation (1) is $$\text{cage whirling frequency} = 0.5 \times \text{rpm} \times \left(1 - \frac{D}{\text{dm}}\right) \times \cos(\alpha)$$

where rpm denotes the rotor rotating speed (inner ring), D denotes the ball diameter, dm denotes the averaging orbital diameter, and a denotes the contact angle.

Accordingly, in the high speed ball bearing, not only a dynamic relationship of the inner and outer rings and the balls but also as rotational stability of the cage has a great role in the overall stability of the ball bearing. FIG. 1 shows the causes of cage instability, and represents mechanism of intermittent collisions between the cage and the rolling elements. By these causes, the cage has intermittently abnormal whirling motions and number of whirling rotations, and referring to FIGS. 2A, 2B, 2C, 2D, 2E and 3A, the whirling scale and the whirling ratio of the cage during instability are depicted. As described above, the cage plays an important role for stable operation of the ball bearing, but research and development of the cage structure that can directly respond to this is still challenging.

To overcome this problem, methods for making the cage pocket design more flexibly have been primarily used, but this is a method that adjusts the structural stiffness of the cage, but not a method using a rotary force.

However, this method has a high likelihood that the strength of the cage itself reduces, causing damage of the cage, and its shape is complex, making it difficult to manufacture, resulting in a drastic increase in manufacturing costs, which limits the range of applications.

SUMMARY

The present disclosure is directed to providing a ball bearing having a cage for enhancing damping capacity and improving rotational stability.

The present disclosure is further directed to providing a ball bearing having a cage part with improved durability by preventing the cage part from wobbling in rotational direction and axial direction.

To achieve the object, a ball bearing of the present disclosure includes an inner ring and an outer ring spaced apart from each other, each being rotatable, a cage part including a first cage and a second cage rotatably installed between the inner ring and the outer ring, and having ball receiving part formed along circumferential direction, ball installed in the ball receiving part, and rotating with the cage part as at least one of the inner ring and the outer ring rotates, and magnet which provides a magnetic force to the ball, wherein the first cage may have a first seating part which is formed between the ball receiving parts, and on which one side of the magnet is placed, and the second cage may have a second seating part which is connected to the first seating part, and on which the other side of the magnet is placed.

Each of the first and second cages may have a contact part, the contact parts contacting each other and being spaced apart in circumferential direction, and the ball receiving part may be formed between the first and second cages provided between the contact parts.

The contact parts formed in the first and second cages may have a screw hole with screw threads in a direction on an inner circumference, the screw hole into which a screw is installed to couple the first and second cages, magnet receiving part may be formed between the first and second seating parts, and the screw hole may be in communication with the magnet receiving part.

The magnet may be in ring shape so that the magnet is inserted into the screw.

The magnet may be placed in circumferential direction with different polarities or same polarity facing each other.

The ball may come into contact with the inner ring and the outer ring in the ball receiving part.

The plurality of ball receiving parts may be provided in the cage part, the first seating part may be provided between the plurality of ball receiving parts along circumferential direction, and the second seating part may be connected to the first seating part and be provided in the second cage along circumferential direction.

BRIEF DESCRIPTION OF THE DRAWINGS

FIG. 6A is an exploded perspective view showing an example in which a magnet is coupled to a screw.

FIG. 6B is a perspective view showing an example in which a magnet is coupled to a screw.

DETAILED DESCRIPTION OF EMBODIMENTS

Figure 1:
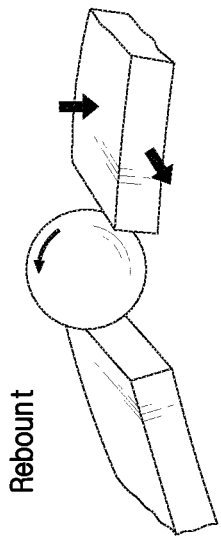
FIG. 1 is a conceptual view showing the cause of cage instability during intermittent collisions and rotations.
Figure 1:
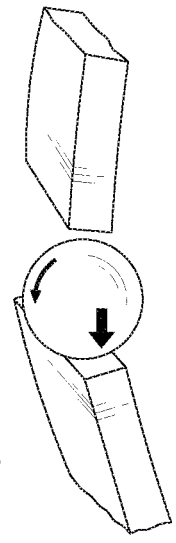
Figure 1:
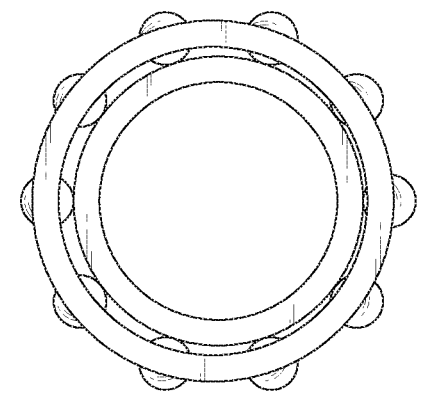
Figure 1:
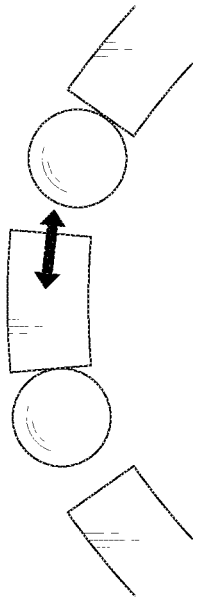
Figure 2A:
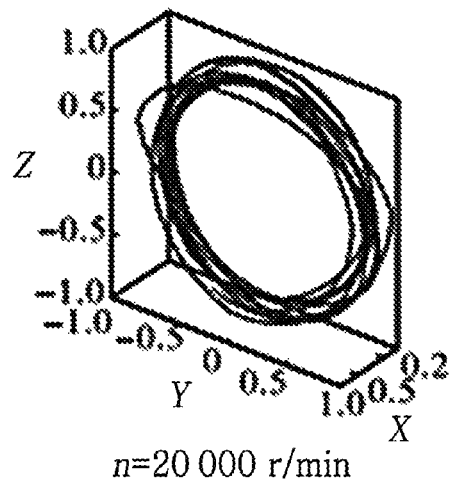
FIG. 2A is a graph showing the whirl orbit of cage during instability.
Figure 2B:
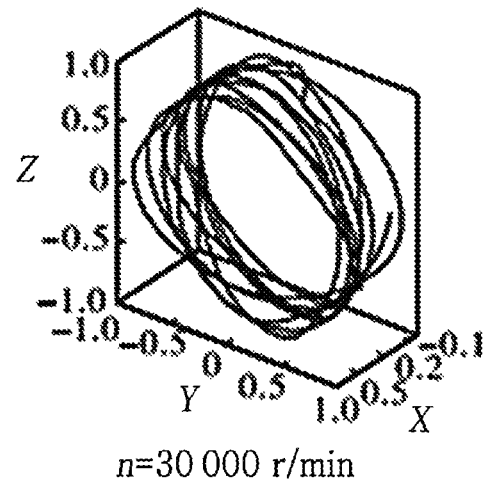
FIG. 2B is a graph showing the whirl orbit of cage during instability.
Figure 2C:
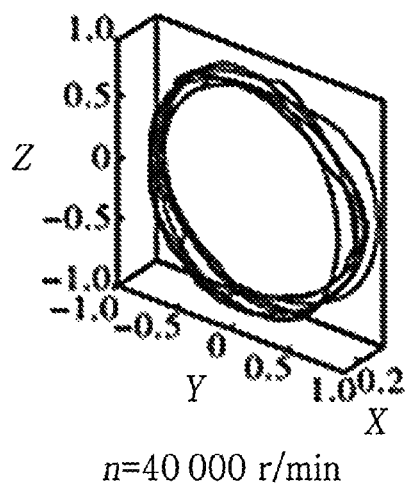
FIG. 2C is a graph showing the whirl orbit of cage during instability.
Figure 2D:
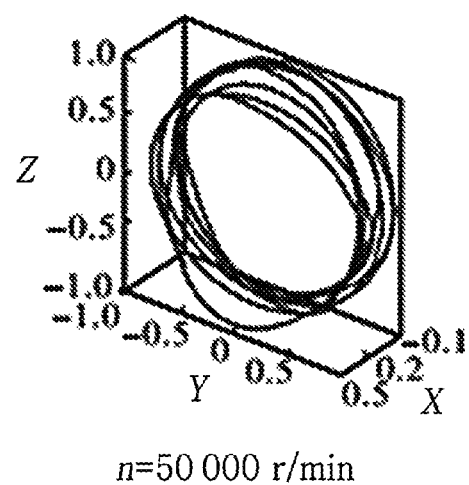
FIG. 2D is a graph showing the whirl orbit of cage during instability.
Figure 2E:
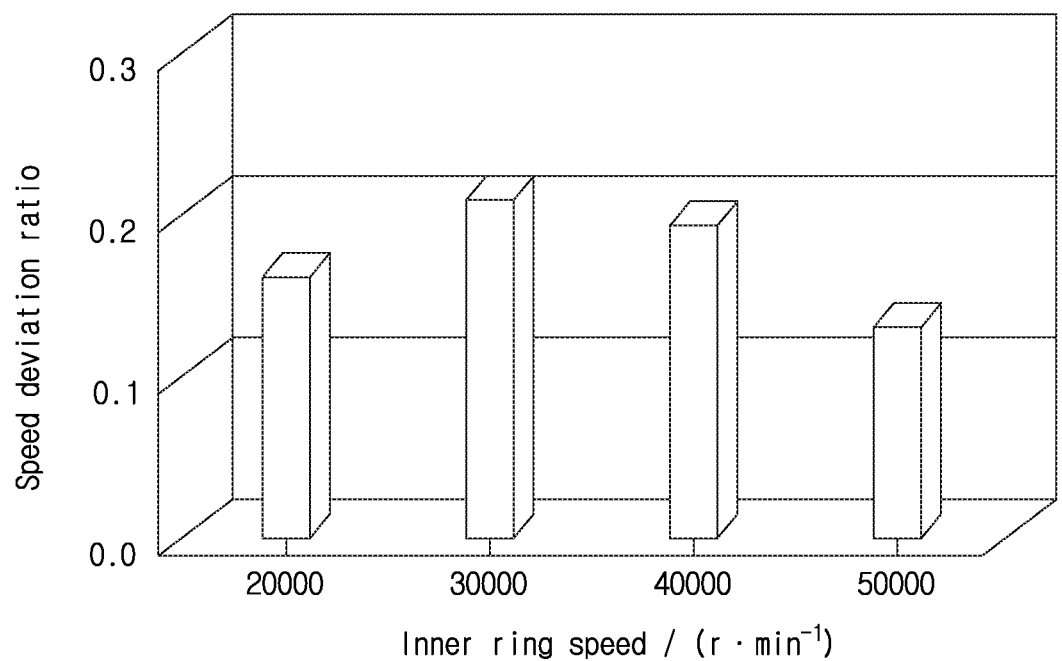
FIG. 2E is a graph showing the whirling ratio of cage during instability.

Hereinafter, the embodiments disclosed herein will be described in detail with reference to the accompanying drawings, in which identical or similar reference numerals are given to identical or similar elements, and an overlapping description is omitted herein. The suffix "unit" as used herein refers to elements or components, and it is only given or interchanged in consideration of facilitation of the description, and does not itself have any distinguishable meaning or role. Furthermore, in describing the embodiments disclosed herein, when a certain description of relevant well-known technology is deemed to render the essential subject matter of the embodiments disclosed herein ambiguous, its detailed description is omitted herein. It should be further understood that the accompanying drawings are only provided to facilitate the understanding of the embodiments disclosed herein, and the technical spirit disclosed herein is not limited by the accompanying drawings and covers all modifications, equivalents or substituents included in the spirit and technical scope of the present disclosure.

The terms including the ordinal number such as "first", "second" and the like may be used to describe various elements, but the elements are not limited by the terms. The terms are only used to distinguish one element from another.

It will be understood that when an element is referred to as being "connected to" another element, it can be directly connected to the other element or intervening elements may be present.

As used herein, the singular forms are intended to include the plural forms as well, unless the context clearly indicates otherwise.

It will be further understood that the terms "comprises" or "includes" when used in this specification, specify the presence of stated features, integers, steps, operations, elements, components or groups thereof, but do not preclude the presence or addition of one or more other features, integers, steps, operations, elements, components, or groups thereof.

The structure of a ball bearing 100 of the present disclosure is described with reference to FIGS. 4A to 5B.

Figure 4A:
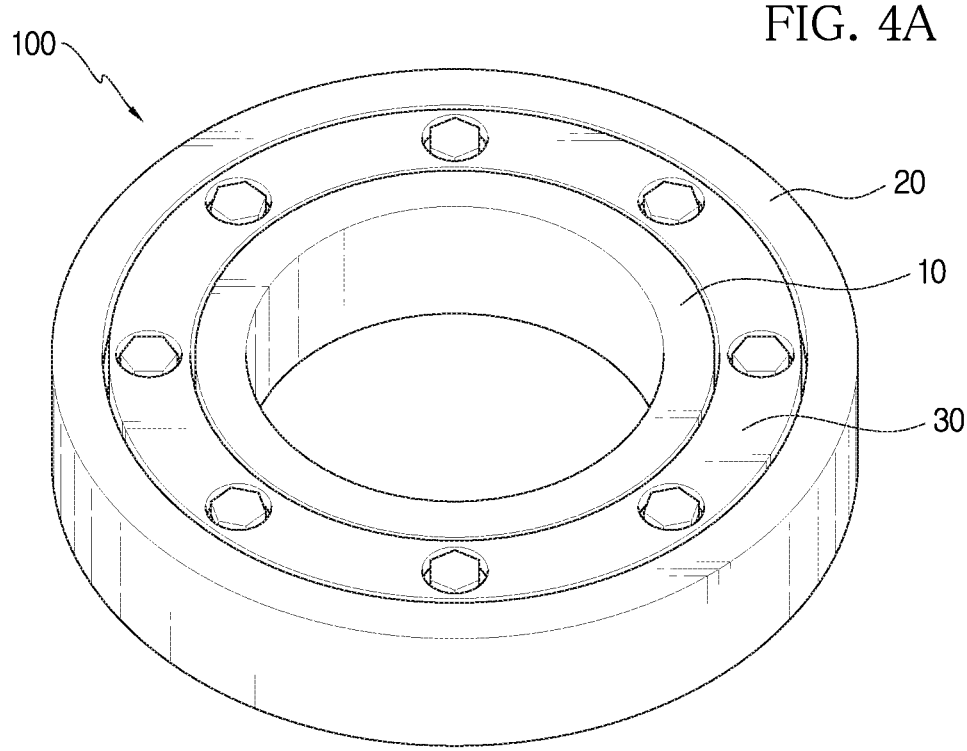
FIG. 4A is a perspective view showing a ball bearing of the present disclosure.
Figure 4B:
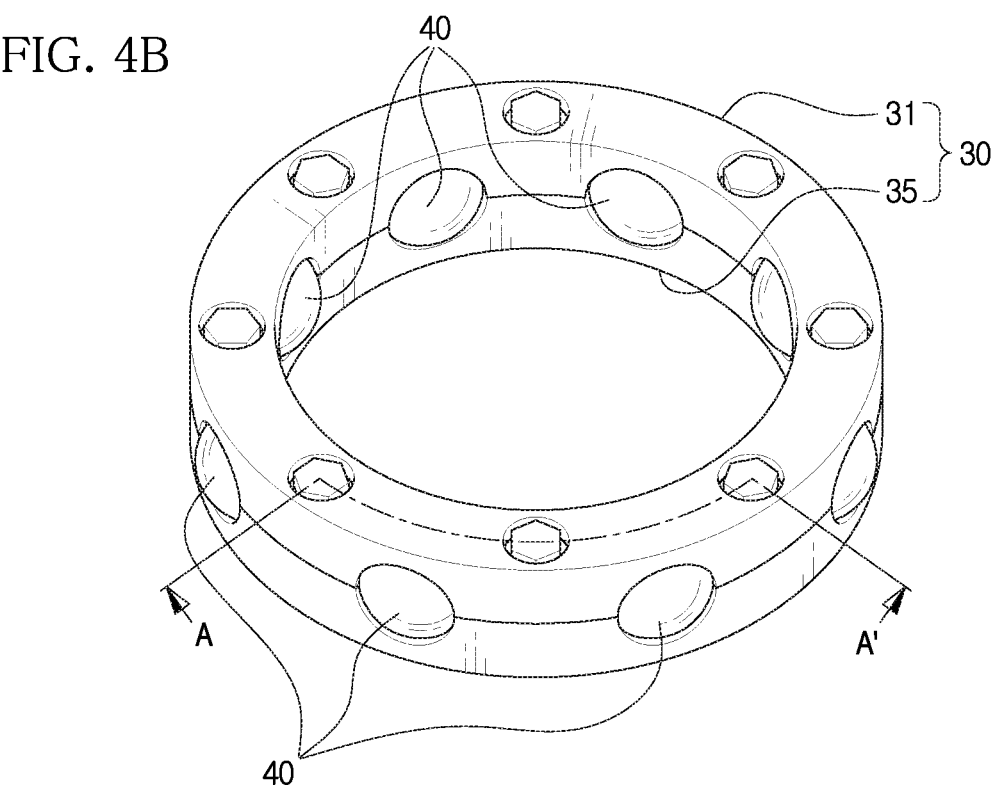
FIG. 4B is a perspective view of FIG. 4A except inner and outer races.

Referring to FIGS. 4A and 4B, the ball bearing 100 of the present disclosure includes an inner ring 10, an outer ring 20, a cage part 30, balls 40 and magnets 50.

The inner ring 10 and the outer ring 20 are spaced apart from each other, and each is rotatable. For example, the inner ring 10 may be fixed and coupled to a rotating shaft (not shown), and the outer ring 20 may be installed in a support (not shown). The inner ring 10 and the outer ring 20 may be understood as rolling elements of the ball bearing 100 of the present disclosure, and the cage part 30 and the balls 40 described below rotate by the rotation of the rolling elements.

Figure 5A:
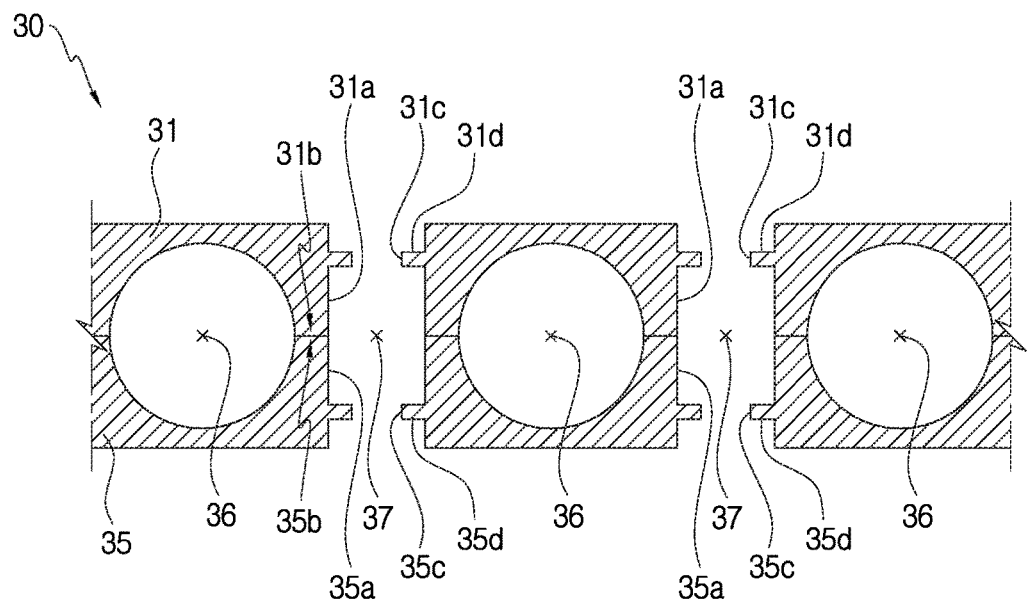
FIG. 5A is a side cross-sectional view of a cage part taken along the line A-A' in FIG. 4B.
Figure 5B:
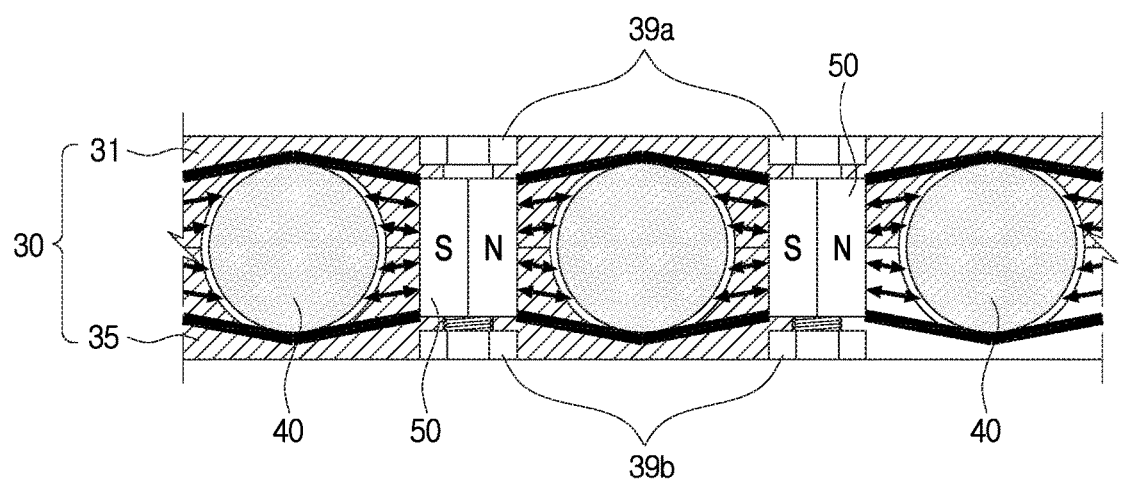
FIG. 5B is a side cross-sectional view of magnetic forces of magnets taken along the line A-A' in FIG. 4B.

The cage part 30 is installed between the inner ring 10 and the outer ring 20, and is rotatable. Referring to FIG. 5A, the cage part 30 has a ball receiving part 36, and the ball receiving part 36 is formed along the circumferential direction. The plurality of ball receiving parts 36 may be provided. Additionally, the ball receiving parts 36 may be curved so that the balls 40 are received therein.

The cage part 30 includes first and second cages 31, 35. The first and second cages 31, 35 may form upper and lower parts of the cage part 30 respectively. The first cage 31 has a first seating part 31a, and the first seating part 31a is formed between the ball receiving parts 36 such that one side of the magnet 50 is placed. Additionally, the second cage 35 has a second seating part 35a which is connected to the first seating part 31a, and on which the other side of the magnet 50 may be placed. Each of the first and second seating parts 31a, 35a may be concavely formed in communication with each other. Additionally, the plurality of first and second seating parts 31a, 35a may be formed along the circumferential direction.

Meanwhile, a magnet receiving part 37 in which the magnet 50 is installed may be formed between the first and second seating parts 31a, 35a. FIG. 5A shows an example of the first seating parts 31a at which the lower surface of the first cage 31 is concavely formed, the second seating parts 35a at which the upper surface of the second cage 35 is concavely formed, and the magnet receiving parts 37 formed by the first and second seating parts 31a, 35a.

The ball 40 is installed in the ball receiving part 36, and rotates with the cage part 30 as at least one of the inner ring 10 and the outer ring 20 rotates. To this end, the ball 40 may be installed in contact with the inner ring 10 and the outer ring 20. For example, as the shaft rotates, the inner ring 10 coupled to the shaft rotates, and accordingly, the ball 40 revolves and the outer ring 20 rotates as well, and the cage part 30 is rotated by the ball 40 installed in the ball receiving part 36. For example, the inner ring 10 may rotate at 1000 rpm, and the ball 40 may rotate at 420 rpm.

The magnet 50 provides a magnetic force to the ball 40. To this end, the magnet 50 may be installed between the plurality of ball receiving parts 36 in the cage part 30 along the circumferential direction. More specifically, the magnet 50 may be installed in the above-described magnet receiving part 37 formed between the first and second seating parts 31a, 35a.

Accordingly, as the magnet 50 installed in the magnet receiving part 37 provides a magnetic force to the ball 40, the ball bearing 100 of the present disclosure may reduce tangential instability caused by a collision on the surface occurring between the ball 40 and the cage part 30, and improve the rotational stability of the cage part 30.

To this end, the ball 40 is preferably positioned within the range of magnetic field of the magnet 50 so that the magnet 50 sufficiently provides a magnetic force to the ball 40. Additionally, the magnet 50 preferably has sufficient magnetic properties to provide a magnetic force to the ball 40 so as to provide tangential damping capacity.

Meanwhile, the first and second cages 31, 35 may have contact parts 31b, 35b respectively, and the first and second cages 31, 35 come into contact with each other through the contact parts 31b, 35b, forming upper and lower parts of the cage part 30. For example, the contact parts 31b, 35b may have contact surfaces that touch each other at the ends of the first and second cages 31, 35. The contact parts 31b, 35b may be provided in the first and second cages 31, 35 along the circumferential direction respectively, and the above-described ball receiving part 36 may be formed between the first and second cages 31, 35 provided between the contact parts 31b, 35b.

The contact parts 31b, 35b of the first and second cages 31, 35 may each have screw holes 31c, 35c formed at higher and lower positions in communication with each other, and a screw 39 may be installed in the screw holes 31c, 35c. The first and second cages 31, 35 may be coupled to each other by coupling the screw 39 into the screw holes 31c, 35c. The screw holes 31c, 35c may be formed in the magnet receiving part 37 in communication with each other.

Additionally, a screw head groove 31d in which a screw head 39a is received may be formed at the upper end of the cage part 30 at which the screw holes 31c, 35c are formed, and a nut groove 35d into which a nut 39b coupled to the end of the screw 39 is inserted may be formed at the lower end of the cage part 30.

FIG. 5A shows an example of the screw head groove 31d formed at the upper end of the first cage 31, and the nut groove 35d formed at the lower end of the second cage 35.

Figure 7A:
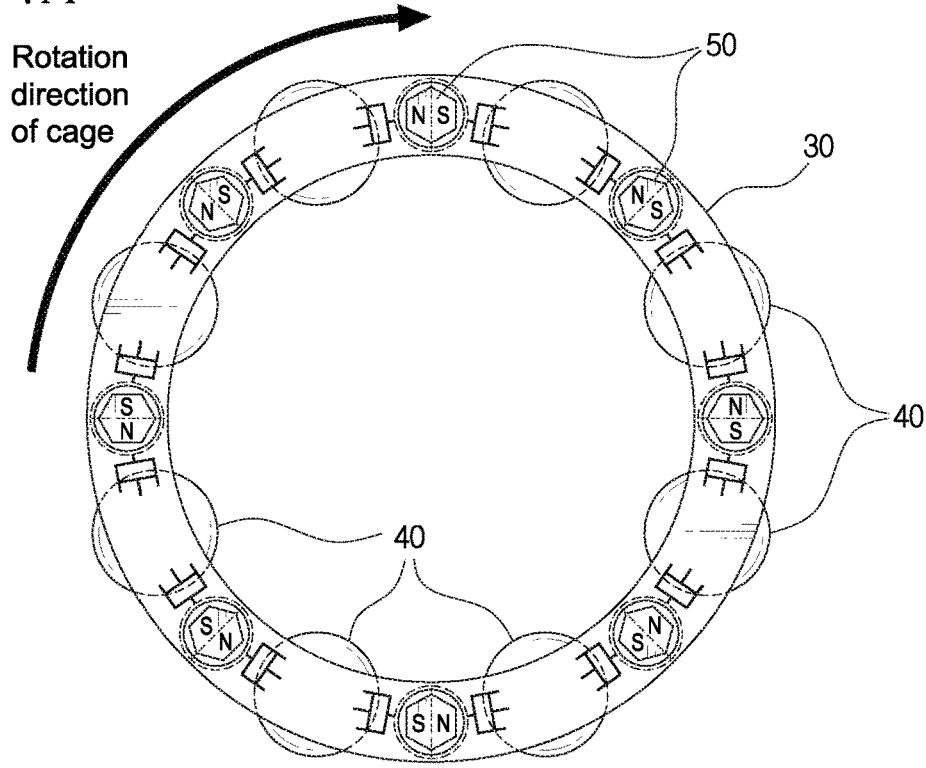
FIG. 7A is a conceptual view showing an example of magnets arranged with different polarities facing each other.
Figure 7B:
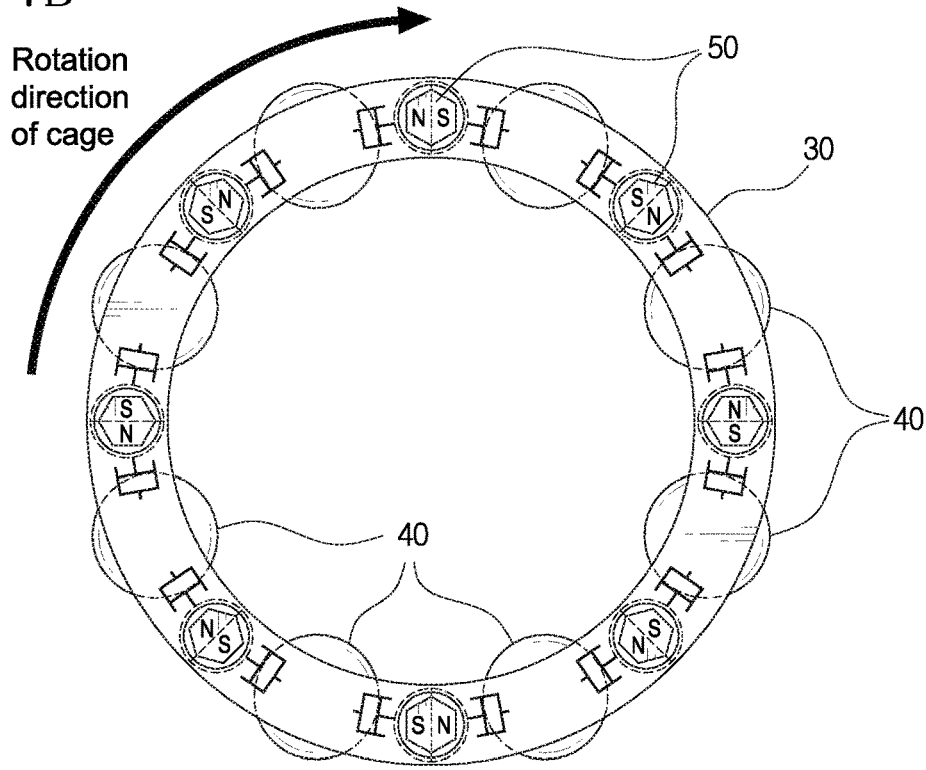
FIG. 7B is a conceptual view showing an example of magnets arranged with the same polarity facing each other.

Meanwhile, the magnet 50 may be formed in ring shape so that the magnet 50 can be inserted into the screw 39 which is installed in the screw holes 31c, 35c. Additionally, referring to FIGS. 7A and 7B, the magnets 50 may be arranged in the circumferential direction with different polarities or the same polarity facing each other.

Figure 3A:
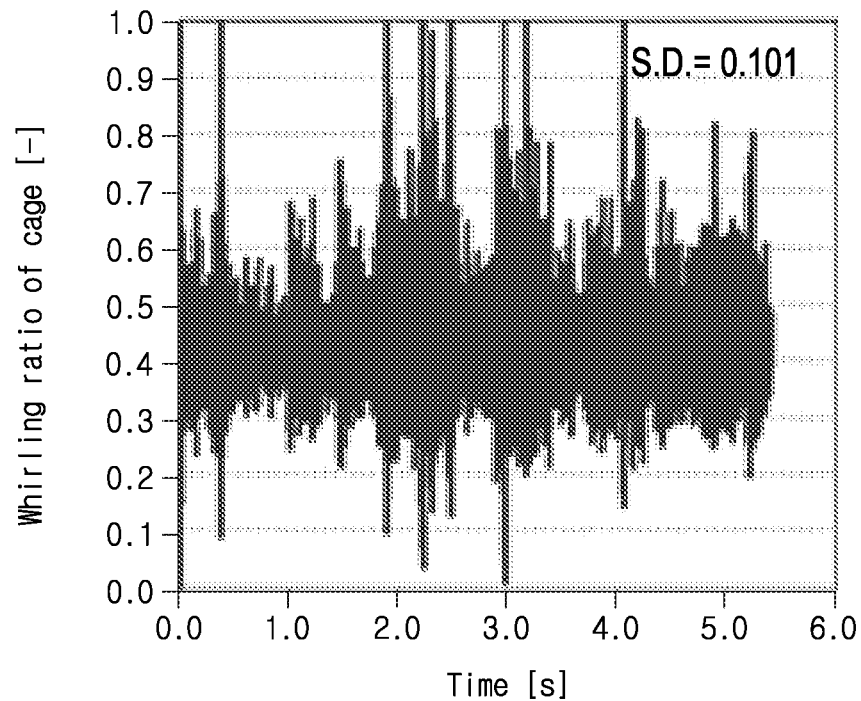
FIG. 3A is a graph showing the whirling ratio of cage in a conventional ball bearing.
Figure 3B:
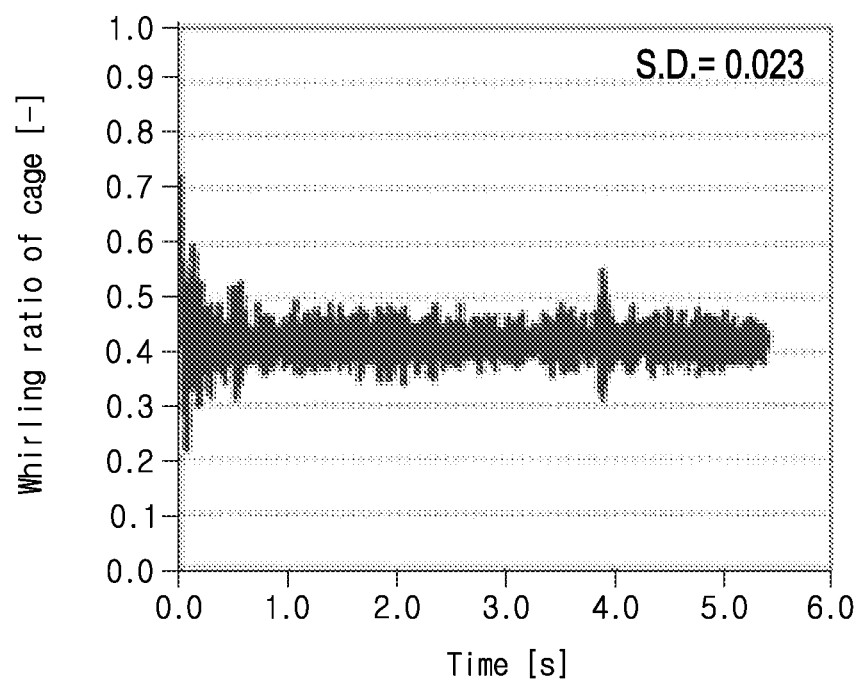
FIG. 3B is a graph showing the whirling ratio of cage in a ball bearing of the present disclosure.

Accordingly, as compared to the whirling ratio by the conventional structure shown in FIG. 3A, referring to FIG. 3B, the whirling speed and the whirling ratio of the cage part is kept constant.

Figure 8A:
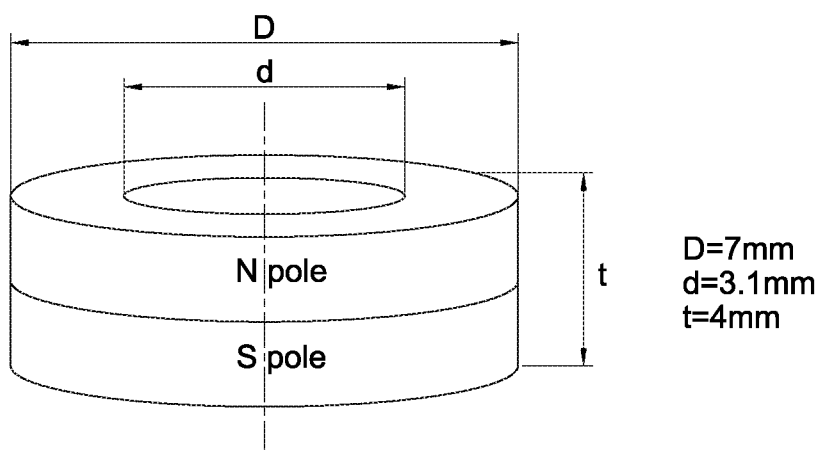
FIG. 8A is a perspective view showing a magnet used in a test.

FIG. 8A shows the shape of a circular magnet with a central hole inserted into the cage, and as shown, the upper part is N, and the lower part is S.

Figure 8B:
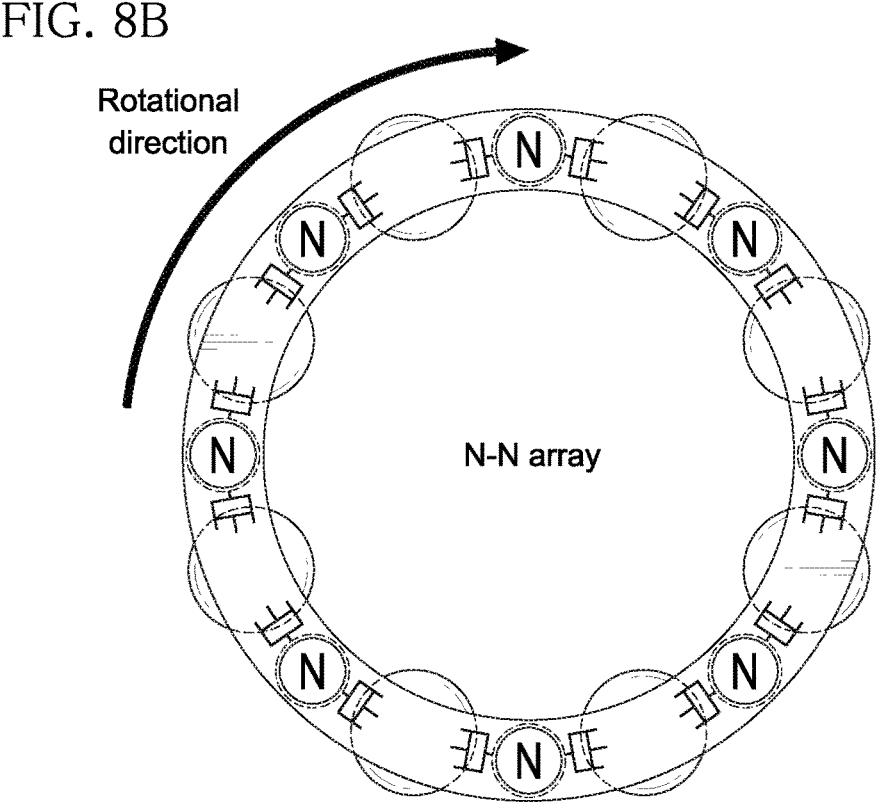
FIG. 8B is a plane view showing an example of N-N arrangement of the magnets of FIG. 8A in a ball bearing.
Figure 8C:
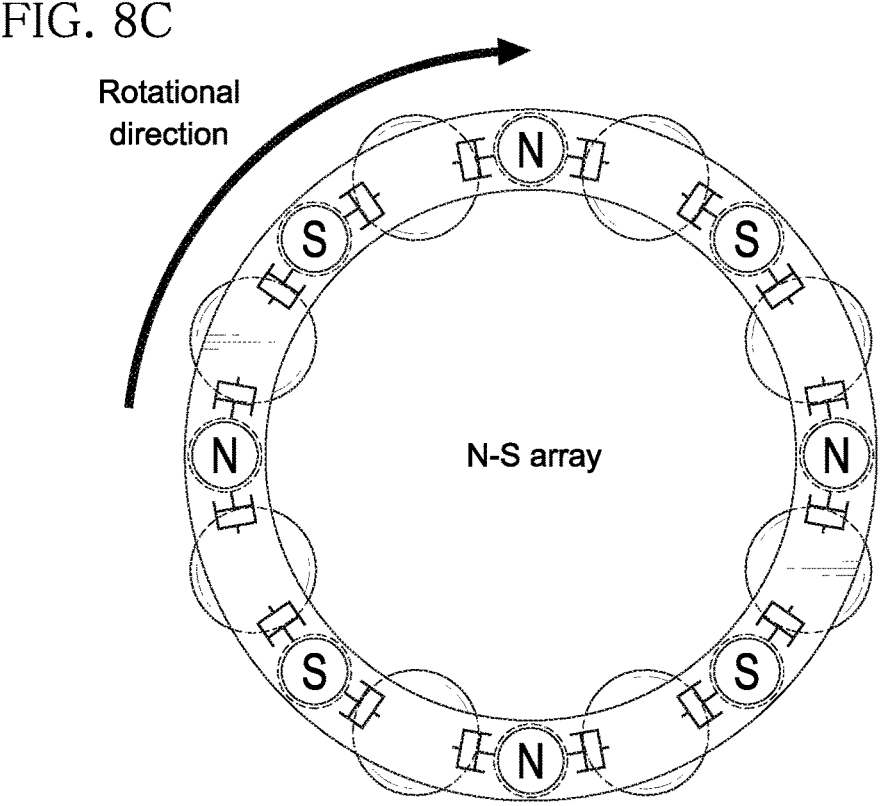
FIG. 8C is a plane view showing an example of N-S arrangement of the magnets of FIG. 8A in a ball bearing.

The magnets are assembled between the balls together with bolts, and two lower diagrams show that the magnets are placed with varying polarities when assembling to investigate the influence of polarity placement of the magnets (In FIG. 8B, the magnets are assembled with the N pole facing up, and in FIG. 8C, the magnets are assembled with the N pole and the S pole facing up in alternating manner).

Figure 9A:
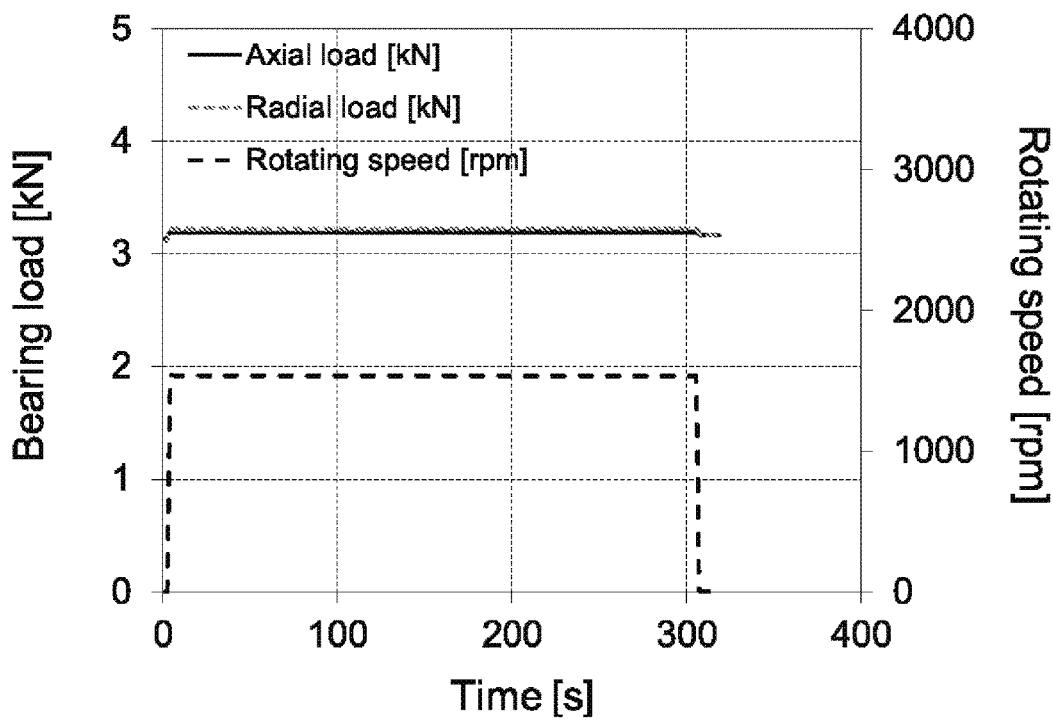
FIG. 9A is a graph showing the results of rotational speed under bending load test condition.
Figure 9B:
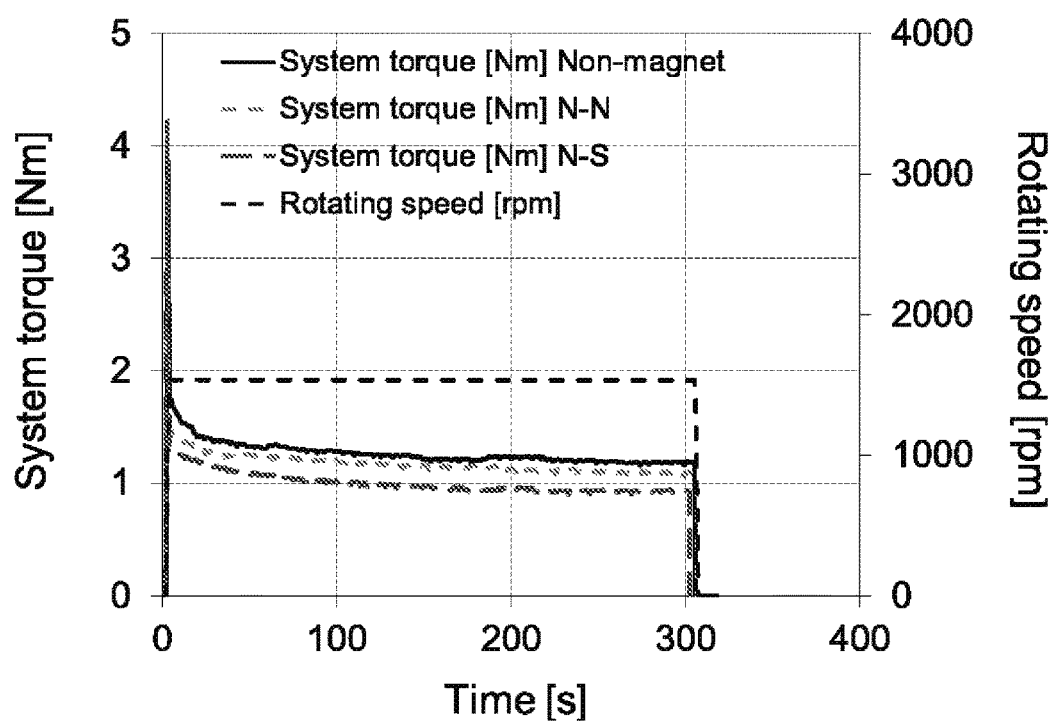
FIG. 9B is a graph showing the results of rotational speed under system torque value test condition.
Figure 9C:
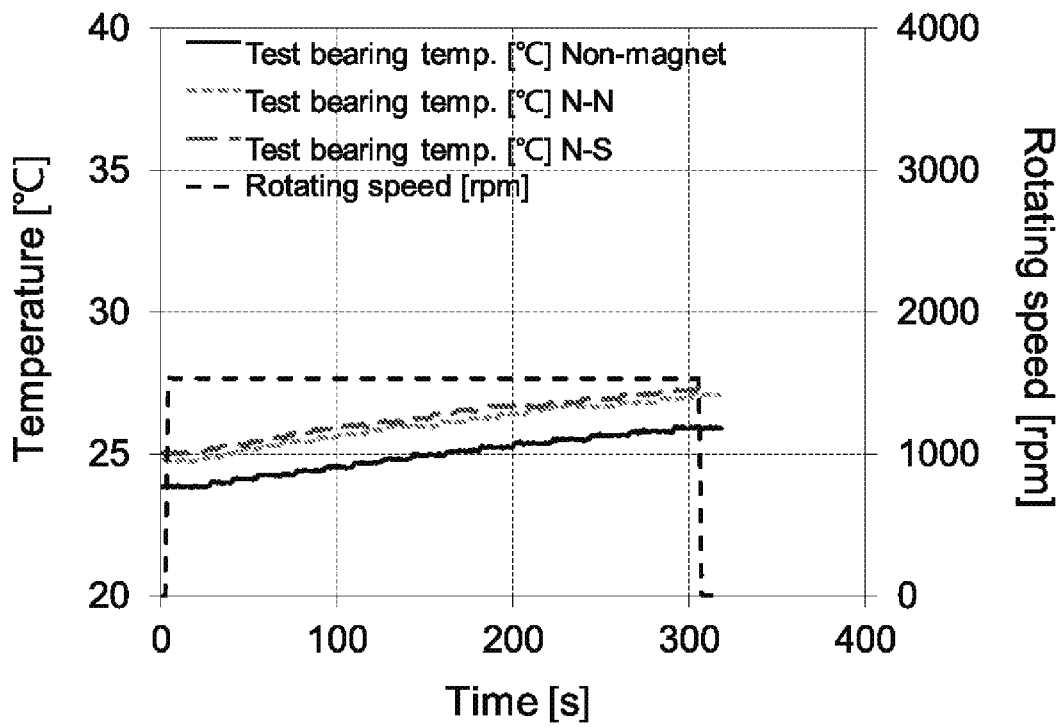
FIG. 9C is a graph showing the results of rotational speed under temperature value test condition.
Figure 9D:
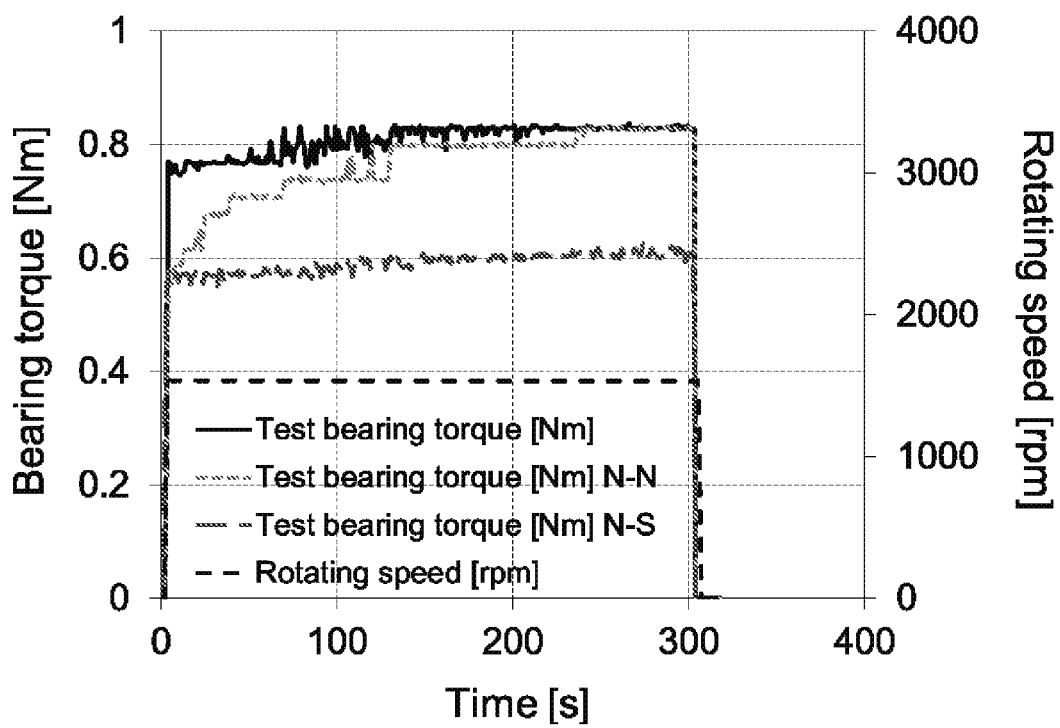
FIG. 9D is a graph showing the results of rotational speed under bending torque value test condition.

FIGS. 9A to 9D show test conditions in a real test. FIG. 9A shows radial and axial loads applied to the bearing, FIG. 9B shows torque of all including the support bearing measured at the end of the motor, FIG. 9C shows the temperature measured at the outer ring of the test ball bearing based on polarity placement, and FIG. 9D shows the torque of the test ball bearing based on magnet arrangement. Particularly, referring to FIG. 9D, it can be seen that the bearing torque is smallest in N-S arrangement.

Figure 10A:
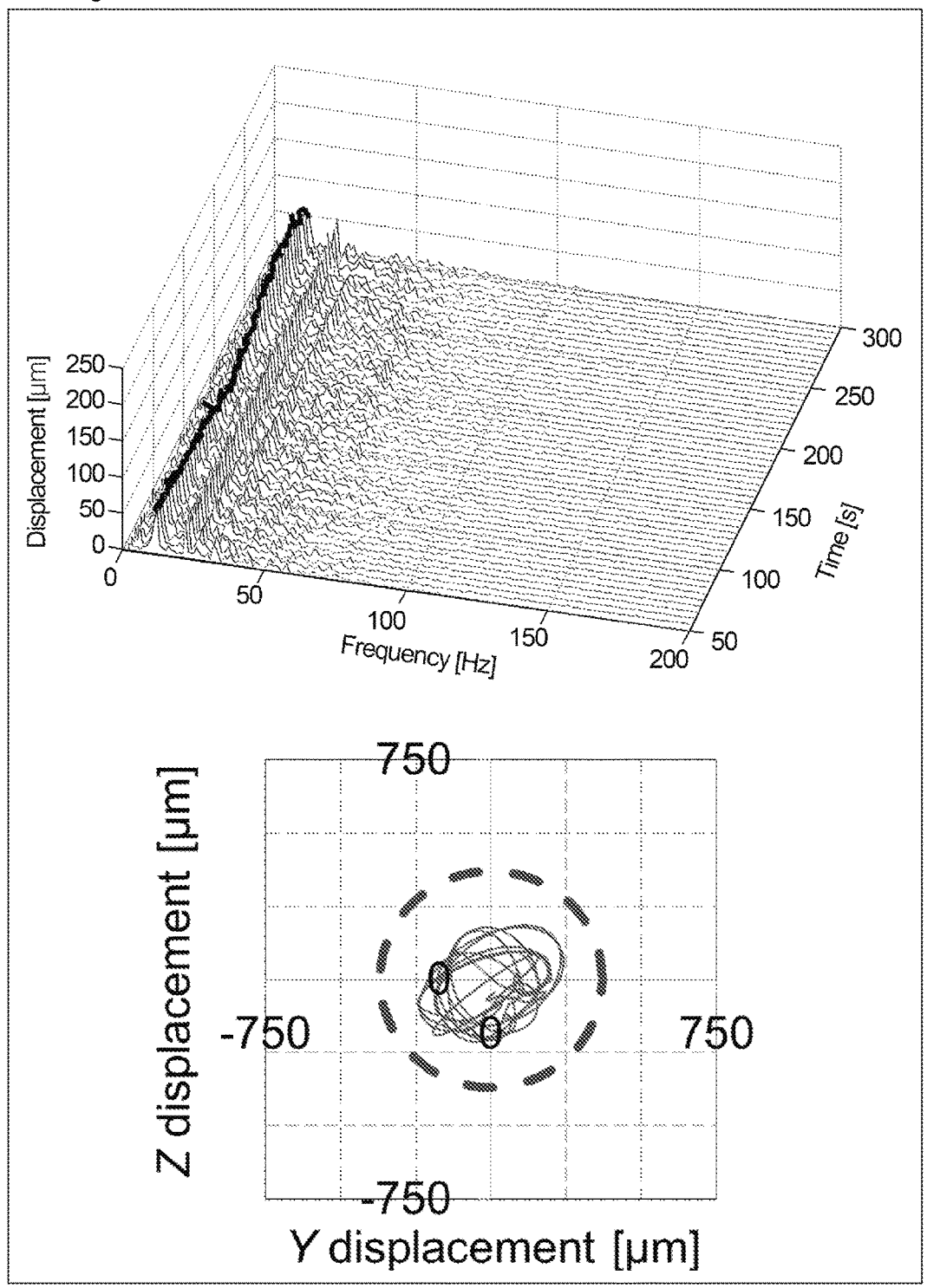
FIG. 10A is a graph of displacement value and cage orbit over time when there is no magnet.
Figure 10B:
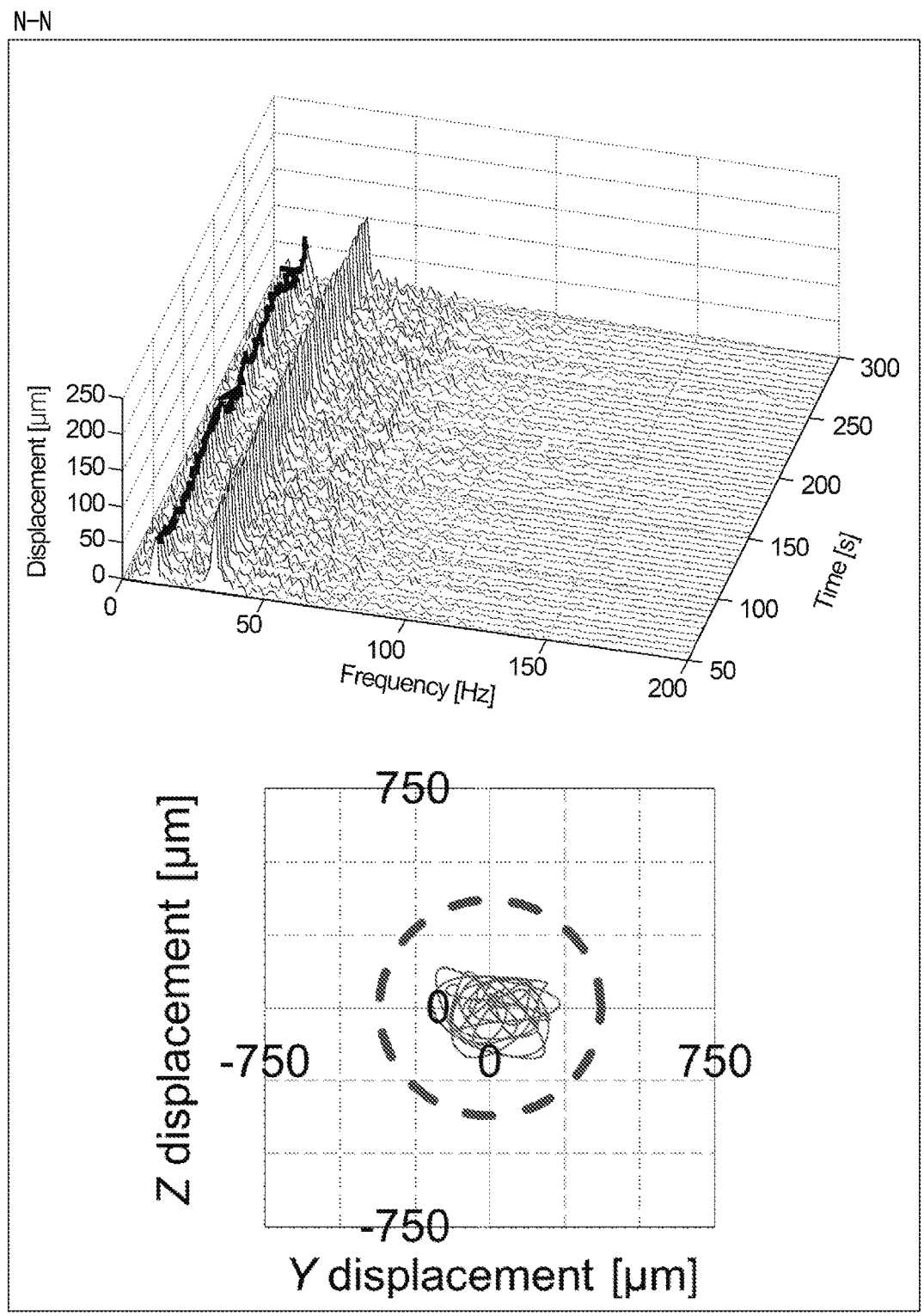
FIG. 10B is a graph of displacement value and cage orbit over time when magnets are arranged in N-N in a ball bearing.
Figure 10C:
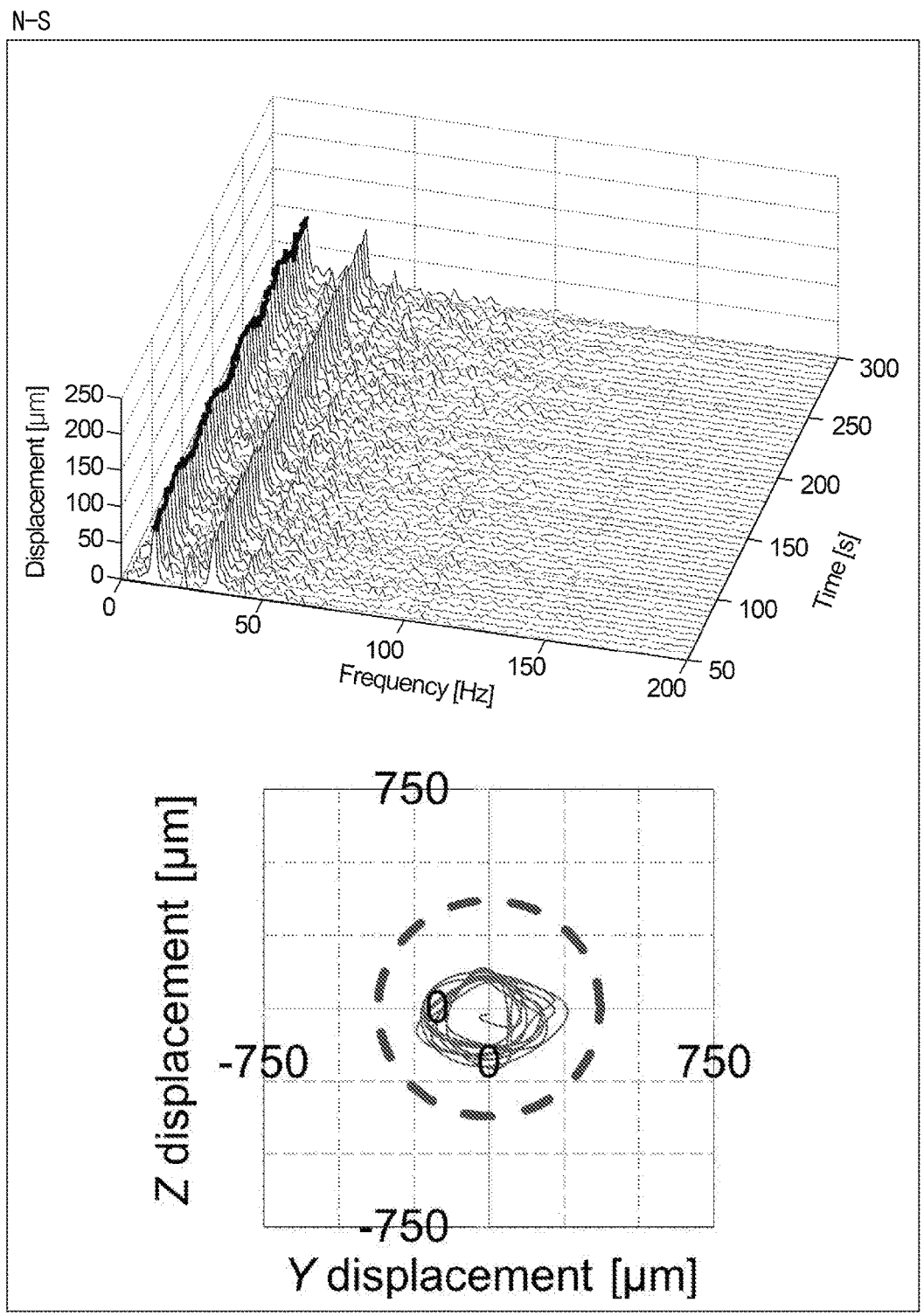
FIG. 10C is a graph of displacement value and cage orbit over time when magnets are arranged in N-S in a ball bearing.

FIGS. 10A to 10C show Waterfall graphs (upper) of the cage whirling frequency and cage whirl orbit (lower) based on magnet placement. In the Waterfall graph, the red line represents synchronous component in the cage whirling frequency. The cage whirling frequency is kept constant without a great change of synchronous component in N-S arrangement, and thus is found to be the most stable, and a difference will be seen through the lower orbit graph.

Figure 11A:
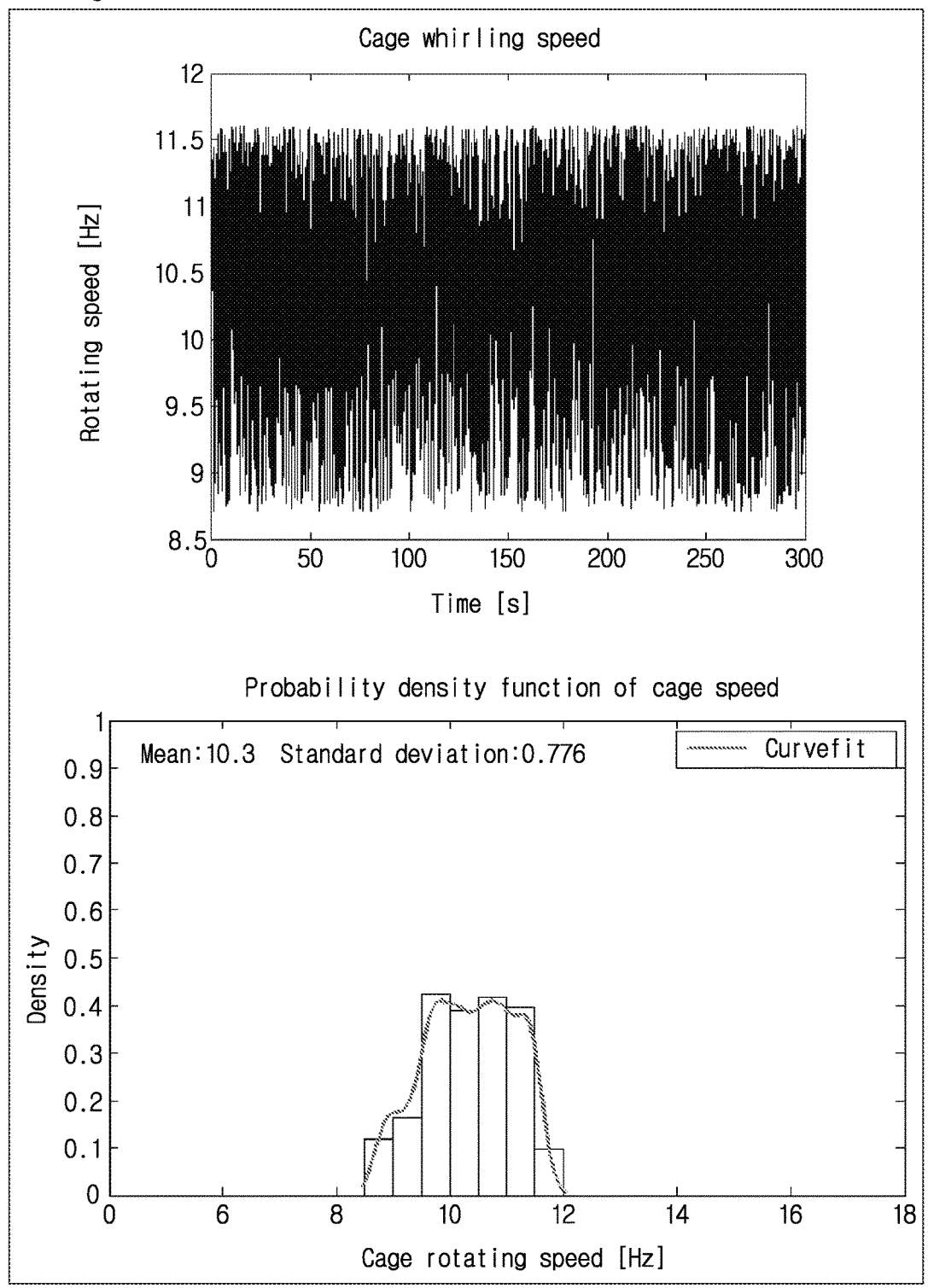
FIG. 11A shows distribution and standard deviation of cage whirling frequency when there is no magnet.
Figure 11B:
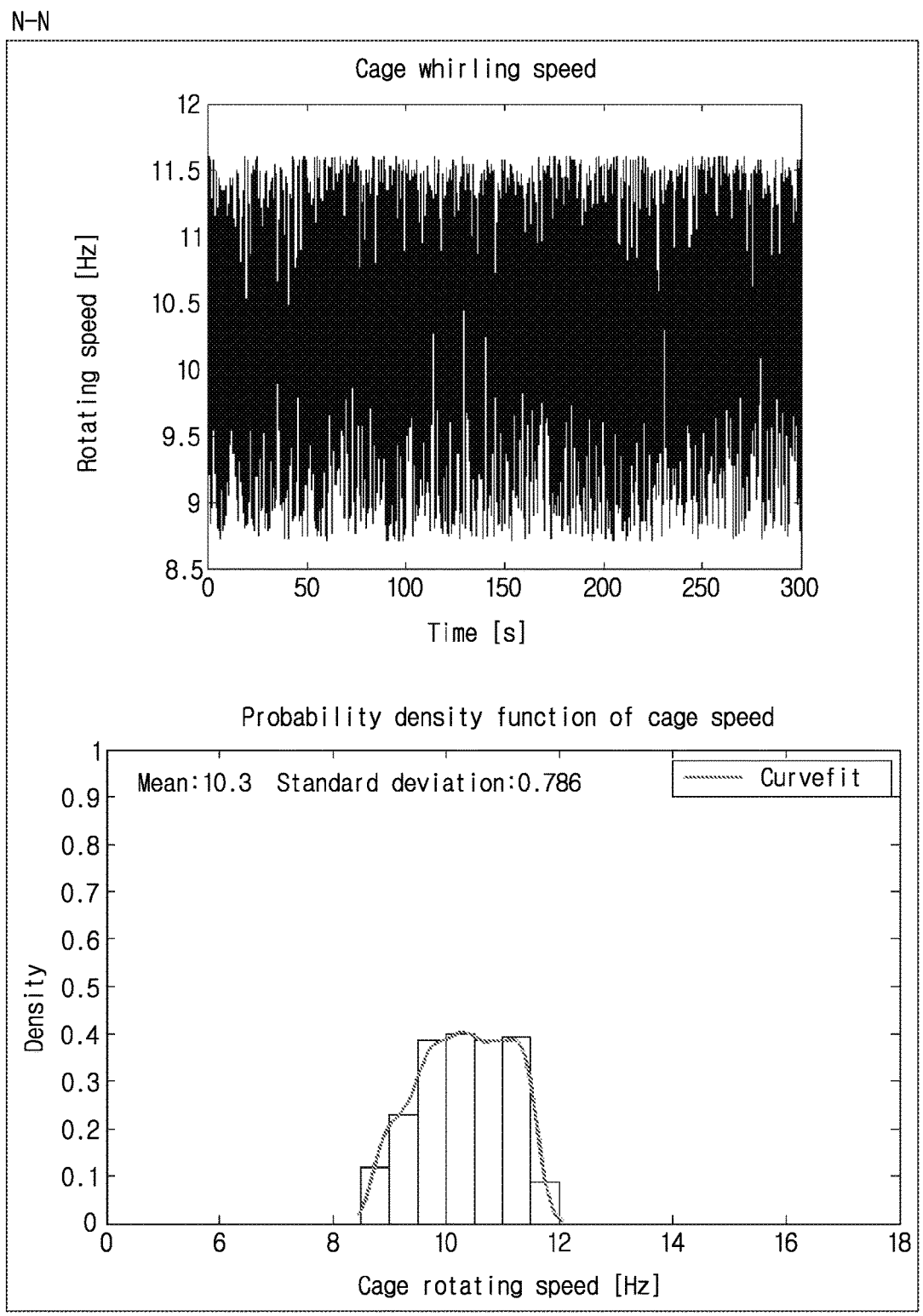
FIG. 11B shows distribution and standard deviation of cage whirling frequency when magnets are arranged in N-N in a ball bearing.
Figure 11C:
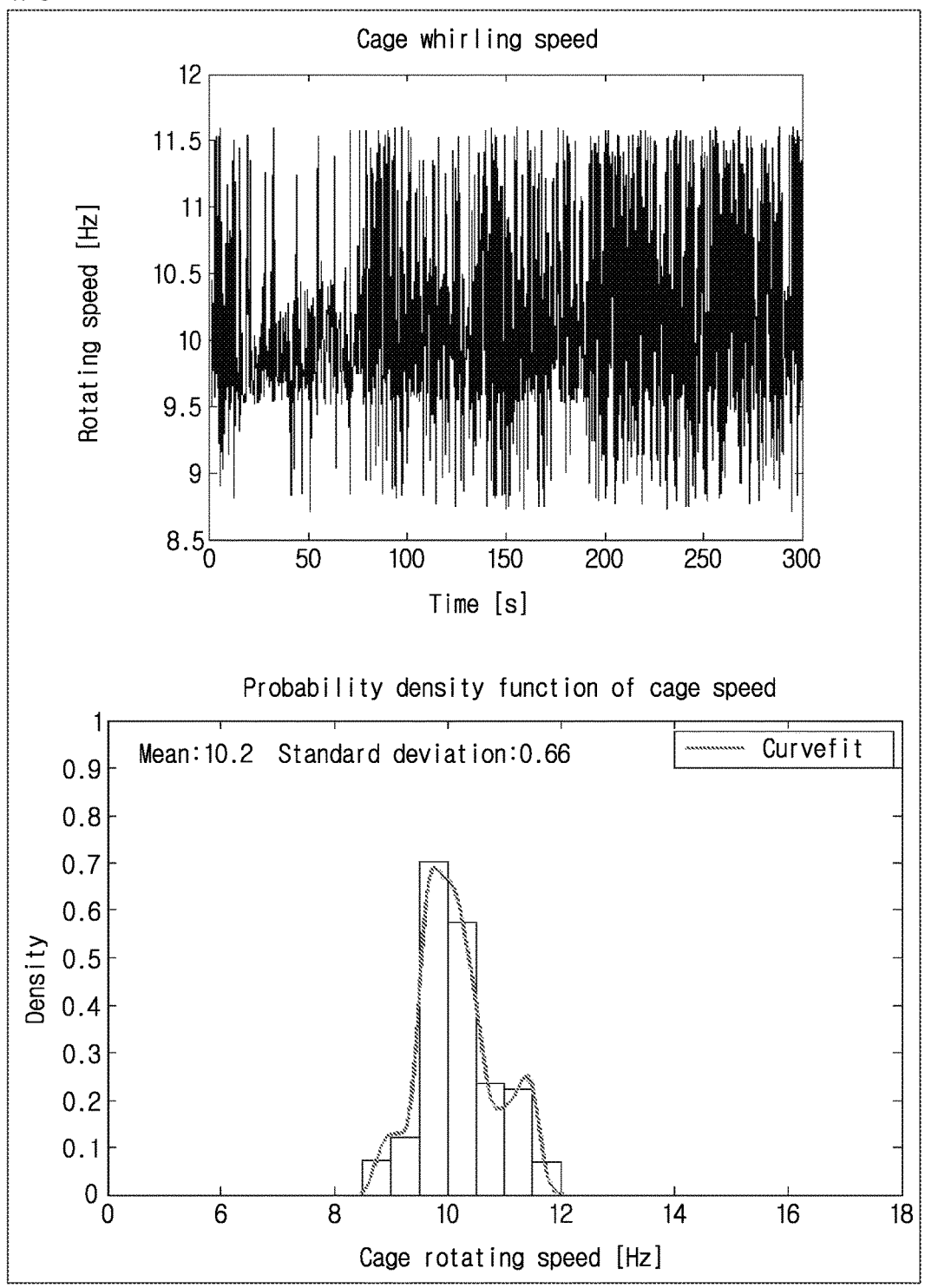
FIG. 11C shows distribution and standard deviation of cage whirling frequency when magnets are arranged in N-S in a ball bearing.

In FIGS. 11A to 11C, the upper diagrams are the results of measuring the cage whirling frequency at the time axis in real time. It is desirable that the cage whirling frequency does not greatly change over time and is constant, and the cage whirling frequency shows a constant value with relatively small variable component in N-S polarity arrangement. However, because it is difficult to see with a naked eye, representation such as the lower diagram is made using mathematical technique (probability density function). The lower diagram is a probability density function graph, and shows how constant the cage whirling frequency is kept. Accordingly, when the graph is not wide over the horizontal axis and is sharp as in N-S polarity arrangement, it indicates that the cage whirling frequency is constant and stable.

The ball bearing of the present disclosure has the magnets installed between the ball receiving parts in the cage part along the circumferential direction, to enhance tangential damping capacity and improve rotational stability.

The ball bearing of the present disclosure has the screw to which the magnet is coupled and the first and second cages coupled to each other with the screw having the magnet installed thereon, thereby preventing the cage part from wobbling in rotational direction and axial direction and improving the durability of the cage part.

The ball bearing 100 as described above is not limited to the configuration and method of the embodiments described

| [Detailed Description of Main Elements] | |
|---|---|
| 100: Ball bearing | |
| 10: Inner ring | 20: Outer ring |
| 30: Cage part | 31: First cage |
| 31a: First seating part | 31b, 35b: Contact part |
| 31c, 35c: Screw hole | 31d: Screw head groove |
| 35: Second cage | 35a: Second seating part |
| 35d: Nut groove | 36: Ball receiving part |
| 37: Magnet receiving part | 39: Screw |
| 39a: Screw head | 39b: Nut |
| 40: Ball | 50: Magnet |

What is claimed is:

1. A ball bearing, comprising:
an inner ring and an outer ring spaced apart from each other, each being rotatable;
a cage part including a first cage and a second cage rotatably installed between the inner ring and the outer ring and having ball receiving parts formed along circumferential direction;
balls disposed in the ball receiving parts and rotating with the cage part as at least one of the inner ring and the outer ring rotates; and
magnets providing a magnetic force to the balls,
wherein
the first cage has first seating parts formed between the ball receiving parts and on which one side of the magnets is placed,
the second cage has second seating parts connected to the first seating parts and on which the other side of the magnets is placed,
each of the first cage and the second cage has contact parts spaced apart each other in circumferential direction, the contact parts of the first cage and the second cage contact each other, and the ball receiving parts are formed by the contact parts, the first cage and the second cage,
the contact parts of the first cage and the second cage have screw holes through which screws are inserted to couple the first and second cages,
magnet receiving parts are formed between the first and second seating parts, and
the screw holes are in communication with the magnet receiving parts.

2. The ball bearing according to claim 1, wherein the magnets are ring shaped so that the screws are inserted into the magnets.

3. The ball bearing according to claim 1, wherein the magnets are placed in a circumferential direction with different polarities or same polarity facing each other.

4. The ball bearing according to claim 1, wherein the balls come into contact with the inner ring and the outer ring in the ball receiving parts.

5. A ball bearing, comprising:
an inner ring and an outer ring spaced apart from each other;
a cage part including
a first cage and a second cage rotatably installed between the inner ring and the outer ring and facing with each other,
ball receiving parts and magnet receiving parts formed between the first cage and the second cage and arranged alternately each other along a circumferential direction of the cage part,
contact parts at which the first cage and the second cage contact each other, the contact parts being disposed between the ball receiving parts and the magnet receiving parts such that the contact parts separate the magnet receiving parts from the ball receiving parts, and
screw holes formed such that screws are inserted into the screw holes through the magnet receiving parts to couple the first cage and the second cage;
balls disposed in the ball receiving parts; and
magnets disposed in the magnet receiving parts, the magnets having a cylindrical shape with different polarities or same polarity facing each other.

6. The ball bearing according to claim 5, wherein the screws are further inserted into the magnets disposed in the magnet receiving parts.

* * * * *